United States Patent [19]

McCord, Jr.

[11] 4,088,164

[45] May 9, 1978

[54] PORTABLE ROUTER ATTACHMENT

[75] Inventor: Wilfred M. McCord, Jr., Louisville, Ky.

[73] Assignee: Vermont American Corporation, Louisville, Ky.

[21] Appl. No.: 802,826

[22] Filed: Jun. 2, 1977

[51] Int. Cl.² ............................................. B27G 21/00
[52] U.S. Cl. .......................... 144/252 R; 29/DIG. 44; 29/DIG. 86; 51/273; 90/11 R; 90/12 D; 408/67; 144/134 D
[58] Field of Search ................. 30/124, 133; 90/12 D, 90/11 R; 408/67; 29/DIG. 84, DIG. 86, DIG. 44, DIG. 102; 144/134 R, 134 D, 136 R, 136 D, 251 R, 252 R, 251 A, 252 A; 51/273

[56] References Cited

U.S. PATENT DOCUMENTS

| 1,923,159 | 8/1933 | McLaren | 90/12 D |
| 3,022,806 | 2/1962 | Johnston | 144/252 R |
| 3,882,598 | 5/1975 | Earle | 144/252 R X |

Primary Examiner—Othell M. Simpson
Assistant Examiner—W. D. Bray
Attorney, Agent, or Firm—Harry B. O'Donnell, III

[57] ABSTRACT

This invention provides a novel attachment for a portable router that can perform the dual functions of serving as both a workpiece chip collector and an adjustable depth edge guide with respect to an edge of a workpiece that is aligned generally parallel to the rotational axis of the router bit.

3 Claims, 4 Drawing Figures

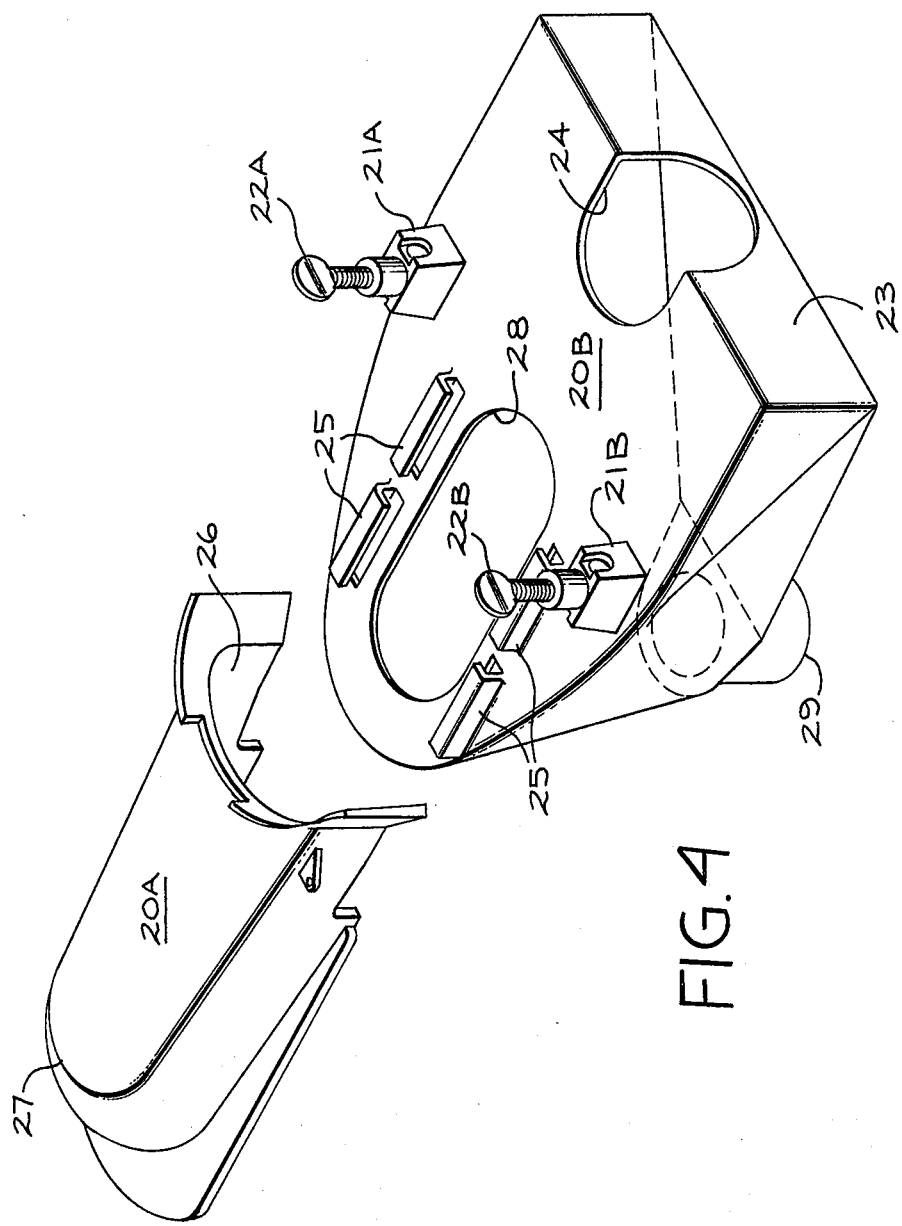

PORTABLE ROUTER ATTACHMENT

BACKGROUND OF THE INVENTION

This invention relates to attachments for a portable router and, more particularly, to a novel attachment for a portable router which can perform the dual functions of serving as both a workpiece chip collector and an adjustable depth edge guide with respect to an edge of a workpiece that is aligned generally parellel to the rotational axis of the router bit.

In the past, it has been known to provide an attachment for a portable router that can perform the single function of collecting chips which are removed by the router bit from a surface of a workpiece that is located generally perpendicular to the rotational axis of the router bit. A typical form of such a prior-art workpiece chip collector attachment has been shown and described in U.S. Pat. No. 3,022,806.

And, as further shown and described in U.S. Pat. No. 2,587,994, another portable router attachment has also been previously developed for performing the single function of serving as an adjustable depth edge guide for the router bit in cutting away material from an edge of a workpiece that is aligned generally parallel to the rotational axis of the router bit.

However, until the advent of the present invention, it has not even been known to provide an attachment for a portable router that could adequately perform the single function of collecting chips that are removed by the router bit from an edge of a workpiece that is aligned generally parallel to the rotational axis of the router bit, let alone to provide a single attachment for a portable router that could, also, at the same time, perform the additional function of serving as an adjustable depth edge guide with respect to such an edge of a workpiece.

SUMMARY OF THE INVENTION

The present invention provides a novel attachment for a portable router that can perform the dual functions of serving as both a workpiece chip collector and an adjustable depth edge guide with respect to an edge of a workpiece that is aligned generally parallel to the rotational axis of the router bit.

The novel attachment of the present invention is particularly adapted for use with a conventional portable router of a type including a housing which contains rotatable router bit chuck means and has, beneath those chuck means and arranged generally perpendicular to the rotational axis thereof, a lower surface that, in part, can be rested atop a surface of a workpiece to align a chucked router bit generally perpendicular to that workpiece surface and generally parallel to an edge of that workpiece surface which is to be cut upon by the lower portion of the router bit and which housing is provided with a workpiece chip discharge opening between its lower surface and the chuck means that will then open upwardly and rearwardly from that workpiece edge and has on opposite sides of that opening a pair of sockets into which there can be respectively received and fastened a pair of attachment mounting rods such that each of those rods will be arranged generally perpendicular to that workpiece edge and have a front end which extends toward that workpiece edge and a rear end that extends away from that workpiece edge.

Basically, the novel portable router attachment of the present invention comprises hollow casing means which include a lower casing section and an upper casing section that are movable relative to one another. The lower casing section has on its upper surface a pair of apertured lugs that can be respectively slipped over the rear ends of the aforenoted attachment mounting rods and adjustably fastened thereto to adjustably locate its front edge with respect to the chucked router bit lower portion and to that edge of the workpiece which is aligned generally parallel to the rotational axis of the router bit. The lower casing front edge comprises a planar surface that will then be aligned in direct opposition to that workpiece edge to thus serve as an adjustable depth guide for the chucked router bit lower portion during its cutting upon that workpiece edge. The lower casing section front edge is further provided with an inlet opening for receiving workpiece chips thus discharged by the cutting of the chucked router bit lower portion upon that workpiece edge. The upper casing section is mountable in track means provided on the upper surface of the lower casing section for movement relative thereto and the thus mounted upper casing section has an opening in the front end thereof that can be fluid-connected into the aforenoted workpiece chip discharge opening that is provided in the router housing and also has a rear end that is adjustably alignable over a workpiece chip inlet opening that is provided in the rear portion of the upper surface of the lower casing section. The lower casing section is also provided with an outlet opening for discharging all of the workpiece chips entering the casing means that can be connected to a vacuum source. And, preferably, yieldable fastener means are provided for fastening the upper casing section to the router housing.

BRIEF DESCRIPTION OF THE DRAWINGS

The present invention is illustrated in the accompanying drawings, wherein:

FIG. 4 is an exploded, perspective view of the structural elements comprising the presently preferred embodiment of the novel attachment of the present invention shown in FIGS. 1-3.

DETAILED DESCRIPTION

Figure 1:
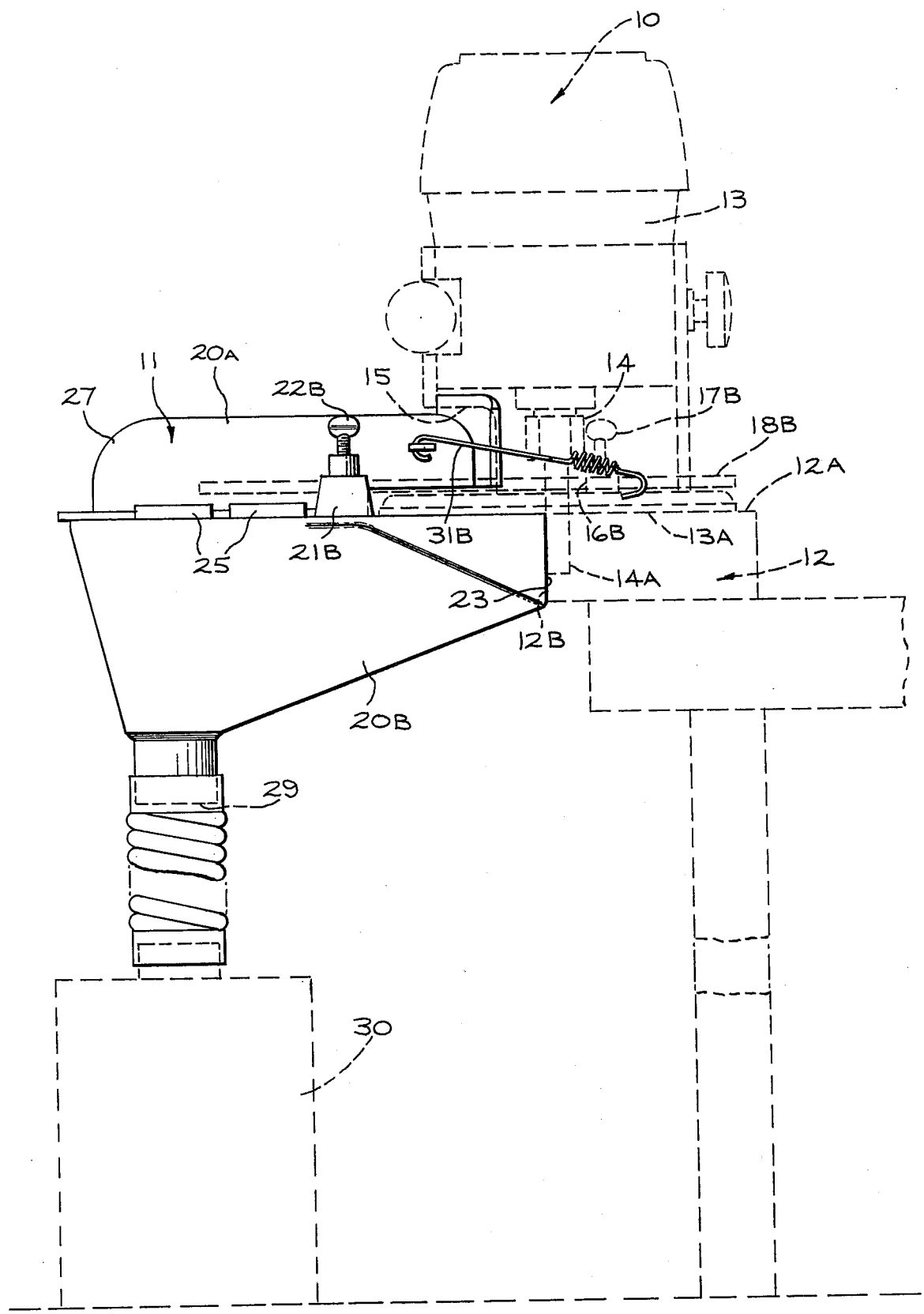
FIG. 1 is a somewhat schematic right-side elevational view of a typical portable router and its attachment mounting rods (shown in shadow lines) having a presently preferred embodiment of the novel attachment of the present invention (shown in solid lines) attached to it and engaged with a workpiece (shown in shadow lines)
Figure 2:
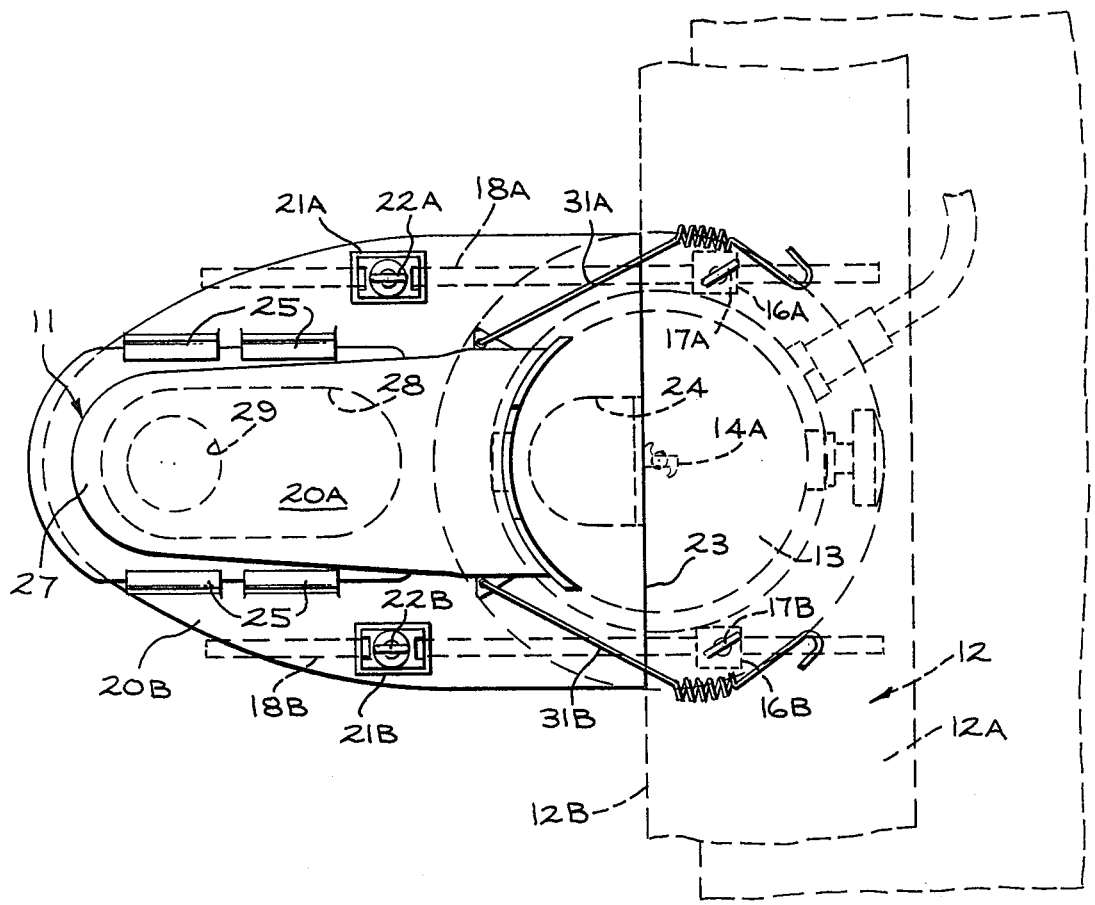
FIG. 2 is a top-plan view of the portable router, novel attachment, and workpiece shown in FIG. 1.
Figure 3:
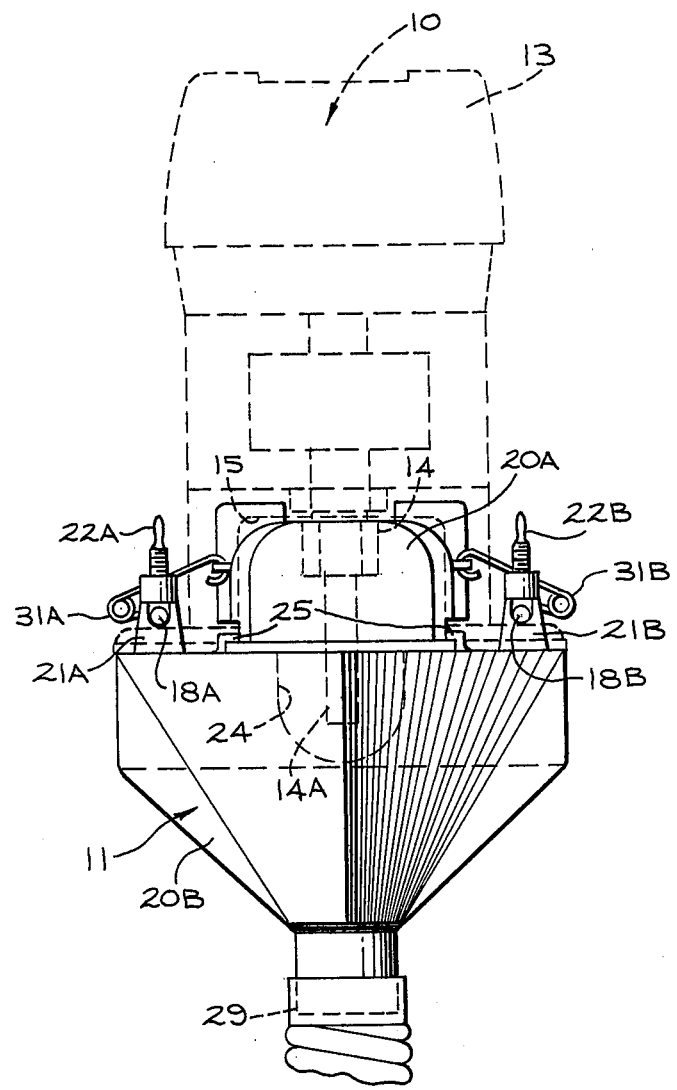
FIG. 3 is a rear-end elevational view of the portable router, novel attachment, and workpiece shown in FIGS. 1 and 2.

Turning now to the drawings and more particularly to FIGS. 1-3 thereof, there is illustrated a typical portable router 10 having a presently preferred embodiment of a novel attachment 11 that is provided in accordance with the present invention attached to it and engaging an edge 12B of a workpiece 12 that is to be worked.

As shown in drawing FIGS. 1-3, the portable router 10 is of a conventional type including a housing 13 which contains rotatable router bit chuck means 14 and has, beneath those chuck means 14 and arranged generally perpendicular to the rotational axis thereof, a lower surface 13A that, in part, can be rested atop a surface 12A of the workpiece 12 of align a chucked router bit 14A generally perpendicular to that workpiece surface 12A and generally parallel to the edge 12B of that workpiece surface 12A which is to be cut upon by the lower portion of the router bit 14A. The router housing 13 is generally enclosed but is provided with a workpiece chip discharge opening 15 between its lower surface 13A and the chuck means 14 that will then open upwardly and rearwardly from that workpiece edge 12B that is to be worked upon and has on opposite sides of that opening 15 a pair of sockets 16A and 16B into which there can be respectively received and fastened, as by a pair of set screws 17A and 17B, a pair of attachment mounting rods 18A and 18B, such that each of those rods 18A and 18B will be arranged generally perpendicular to that workpiece edge 12B that is to be worked upon and have a front end which extends toward that workpiece edge 12B and a rear end that extends away from that workpiece edge 12B.

As further shown in drawing FIGS. 1-3, the novel attachment 11 that is provided in accordance with the present invention can be employed with the portable router 10 to perform the dual functions of serving as both a workpiece chip collector and an adjustable depth edge guide with respect to the edge 12B of the workpiece 12 that is aligned generally parallel to the rotational axis of the router bit 14A.

Basically, as best illustrated in drawing FIGS. 1-4, the novel portable router attachment 11 of the present invention comprises hollow casing means which include a lower casing section 20B and an upper casing section 20A that are movable relative to one another. While these two casing sections 20B and 20A may be formed otherwise, they are preferably molded of a rigid thermoplastic material.

As further illustrated in drawing FIGS. 1-4, the lower casing section 20B has integrally formed on its upper surface a pair of apertured lugs 21A and 21B that can be respectively slipped over the rear ends of the aforenoted attachment mounting rods 18A and 18B and adjustably fastened thereto, as by a pair of thumb screws 22A and 22B, to adjustably locate its front edge 23 with respect to the lower portion of the chucked router bit 14A and to that edge 12B of the workpiece 12 which is aligned generally parallel to the rotational axis of the router bit 14A. The front edge 23 of the lower casing section 20B comprises a planar surface that will then be aligned in direct opposition to that workpiece edge 12B to thus serve as an adjustable depth guide for the lower portion of the chucked router bit 14A during its cutting of that edge 12B of the workpiece 12.

And, as yet further illustrated in drawing FIGS. 1-4, the front edge 23 of the lower casing section 20B is provided with an inlet opening 24 for receiving workpiece chips thus discharged by the cutting of the lower portion of the chucked router bit 14A upon that workpiece edge 12B. This opening 24 also extends rearwardly through the front portion of the upper surface of the lower casing section 20B and thus also permits the aforenoted adjustable positioning of the planar front edge 23 with respect to the lower portion of the router bit 14A and the edge 12B of the workpiece 12 that is to be worked, such that, when the apertured lugs 21A and 21B are located and fastened by the thumb screws 22A and 22B in their foremost positions along the attachment mounting rods 18A and 18B, the depth of the material to be removed by the lower portion of the router bit 14A from the edge 12B of the workpiece will be at minimum.

As yet further shown in drawing FIGS. 1-4, the upper casing section 20A is mountable in track means 25 that are integrally provided on the upper surface of the lower casing section 20B for slidable movement relative thereto and the thus mounted upper casing section 20A has an opening 26 in the front end thereof that can be fluid-connected into the aforenoted workpiece discharge opening 15 that is provided in the router housing 13 and also has a rear end 27 that is adjustably alignable over another second workpiece chip inlet opening 28 that is provided through the rear portion of the upper surface of the lower casing section 20B. And, the lower casing section 20B is also provided with an outlet opening 29 for discharging all of the workpiece chips entering the casing means 20B and 20A that can be connected to a vacuum source, such as the shop vacuum cleaner 30 illustrated in drawing FIG. 1.

As still further illustrated in drawing FIGS. 1-4, yieldable fastener means, such as a pair of tension springs 31A and 31B, are preferably provided for fastening the upper casing section 20A to the router housing 13 to maintain a tight fluid-connection between the opening 26 provided at its front end and the workpiece chip discharge opening 15 that is provided in the router housing 13.

It should be apparent that while there has been described what is presently considered to be a presently preferred form of the present invention of accordance with the Patent Statutes, changes may be made in the disclosed device without departing from the true spirit and scope of this invention. It is, therefore, intended that the appended claims shall cover such modifications and applications that may not depart from the true spirit and scope of the present invention.

What is claimed is:

1. For use with a portable router of a type including a housing which contains rotatable router bit chuck means and has, beneath those chuck means and arranged generally perpendicular to the rotational axis thereof, a lower surface that, in part, can be rested atop a surface of a workpiece to align a chucked router bit generally perpendicular to that workpiece surface and generally parallel to an edge of that workpiece surface which is to be cut upon by the lower portion of the router bit and which housing is provided with a workpiece chip discharge opening between its lower surface and the chuck means that will then open upwardly and rearwardly from that workpiece edge and has on opposite sides of that opening a pair of sockets into which there can be respectively received and fastened a pair of attachment mounting rods such that each of those rods will be arranged generally perpendicular to that workpiece edge and have a front end which extends toward that workpiece edge and a rear end that extends away from that workpiece edge, a combination workpiece chip collector and adjustable depth edge guide attachment, comprising:

(a) hollow casing means which include a lower casing section and an upper casing section that are movable relative to one another, (b) said lower casing section having on its upper surface a pair of apertured lugs that are respectively slippable over the rear ends of the attachment mounting rods and adjustably fastenable thereto to adjustably locate its front edge with respect to the chucked router bit lower portion and to that workpiece edge, (c) said lower casing section front edge comprising a planar surface that is alignable in direct opposition to that workpiece edge to thus serve as an adjustable depth guide for the chucked router bit lower portion during its cutting upon that workpiece edge, (d) said lower casing section front edge being further provided with an inlet opening for receiving workpiece chips thus discharged by the cutting of the chucked router bit lower portion upon that workpiece edge, (e) said upper casing section being mountable in track means provided on said upper surface of said lower casing section for movement relative thereto, (f) said thus mounted upper casing section having an opening in the front thereof that is fluid-connectable into the workpiece chip discharge opening provided in the router housing and having a rear end that is adjustably alignable over a workpiece chip inlet opening that is provided in the rear portion of said upper surface of said lower casing section, and (g) said lower casing section being provided with an outlet opening for discharging all of the workpiece chips entering said casing means that can be connected to a vacuum source.

2. The invention of claim 1, further including fastener means for fastening said upper casing section to the router housing.

3. The invention of claim 2, wherein said fastener means comprise yieldable means.

* * * * *